United States Patent

Diery et al.

[11] 3,856,893
[45] Dec. 24, 1974

[54] HYBRID IONIC PHOSPHORUS COMPOUNDS

[75] Inventors: Helmut Diery, Kelkheim,Taunus; Ulrich Cuntze, Hofheim,Taunus, both of Germany

[73] Assignee: Farbwerke Hoechst Aktiengesellschaft vormals Meister Lucius & Bruning, Frankfurt/Main, Germany

[22] Filed: Dec. 13, 1972

[21] Appl. No.: 314,753

[30] Foreign Application Priority Data
Dec. 13, 1971  Switzerland...................... 18148/71

[52] U.S. Cl............ 260/924, 260/247, 260/293.51, 260/309, 260/309.6, 260/944, 260/945, 260/983, 260/984, 260/987
[51] Int. Cl. ............................................ C07f 9/08
[58] Field of Search.................... 260/924, 944, 945

[56] References Cited
UNITED STATES PATENTS
3,121,731   2/1964   Quesnel et al................. 260/944 X
3,454,677   7/1969   Burpitt............................. 260/924
3,708,558   1/1973   Kny et al. ........................ 260/945

Primary Examiner—Lorraine A. Weinberger
Assistant Examiner—Richard L. Raymond
Attorney, Agent, or Firm—Connolly and Hutz

[57] ABSTRACT

Compounds of the formula

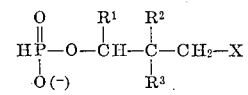

in which $R^1$ represents hydrogen or methyl, $R^2$ and $R^3$ stand for hydrogen or alkyl and X represents an aliphatic ammonium group and their use as tensidies, emulsifiers, and extraction agent in the liquid-liquid extraction of zinc.

4 Claims, No Drawings

HYBRID IONIC PHOSPHORUS COMPOUNDS

The present invention relates to hybrid-ionic phosphorus compounds whose positive charge enter is separated from the negative charge center by 3 carbon atoms and to a process for preparing these compounds.

The new hybrid-ionic phosphorous compounds correspond to the general formula I

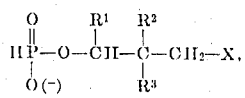
    I in which $R^1$ represents hydrogen or the methyl group, $R^2$ and $R^3$ each represent hydrogen or alkyl groups of 1 to 4 carbon atoms and which may be identical or different, and X represents an ammonium group of the formula

    II

In the formula II, $R^4$ stands for hydrogen, an alkyl or alkenyl group of 1 to 12 carbon atoms or a group of the formula $-(C_nH_{2n}O)_zH$, $R^5$ represents hydrogen or an aliphatic radical having 1 to 20 carbon atoms or a radical of the formula $-(C_nH_{2n}O)_zH$, and $R^6$ represents an aliphatic radical having 1 to 20 carbon atoms or a radical of the formula $-(C_nH_{2n}O)_zH$, in which n stands for 2 or 3 and the sum of all values of z represent 1 to 50, and the rests $R^5$ and $R^6$ together with the nitrogen atom may also form a piperdine, morpholine, imidazole or imidazoline ring, and preferably at least one of the radicals $R^4$, $R^5$ and $R^6$ means an alkyl radical or an alkenyl radical containing at least 8 carbon atoms.

The present invention further relates to a process for preparing the above-specified hybrid-ionic phosphorus compounds, wherein cyclic phosphites of the general formula III

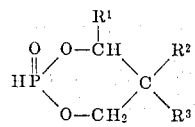    III in which $R^1$, $R^2$ and $R^3$ have the meanings given above are reacted at elevated temperature, suitably while stirring, with primary, secondary or tertiary amines of the formula II

(II)

in which $R^4$, $R^5$ and $R^6$ have the meanings given above.

The compounds used as starting materials are known or may be prepared according to processes known per se.

For preparing the new hybrid ionic phosphorus compounds, there may be used, as primary, secondary or tertiary amines all aliphatic amines or cycloaliphatic amines which react in the same manner as aliphatic amines.

The aliphatic radicals of these amines may be radicals having up to 20 carbon atoms and may be saturated or singly or several times olefinically unsaturated, straight chain or branched, or cyclic radicals, for example cyclohexyl. In addition to pure alkyl or alkenyl radicals, there may also be used substituted alkyl rests which contain, for example hydroxyalkyl radicals, alkylene glycol or polyalkylene glycol ether rests, aromatic rests such as the phenyl or also carbonamidoalkyl rests.

The amines of the general formula II which may be used in the process of the invention are, for example, the following amines: methylamine, isopropylamine, n-butylamine, isobutylamine, n-hexylamine, n-octylamine, isononylamine, decylamine, dodecylamine, oleylamine, stearylamine, eicosylamine, benzylamine, N-methyl-N-n-butylamine, di-n-butylamine, N-methyl-dodecylamine, N-methyl-stearylamine, N-isononyl-dodecylamine, diethanolamine, dipropanolamine, di-n-octylamine, distearylamine, N-isopropyloleylamine, N-iso-propyl-di-n-butylamine, N-methyl-distearylamine, N,N-dimethyl-dodecylamine, N,N-dimethyl-cyclohexylamine, N,N-dimethyl-oleylamine, triisononylamine.

Suitable amines of the formula II are also the reaction products of aliphatic amines with alkylene oxides, for example the addition compounds of up to about 50 moles of ethylene oxide and/or propylene oxide and 1 mole of one of the afore-mentioned primary or secondary amines, or monoacylated alkylene-diamines, for example those of the general formula IV

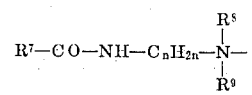    IV in which $R^7$ represents an alkyl or alkenyl radical of 1 to 20 carbon atoms, $R^8$ and $R^9$ each represent hydrogen or alkyl groups of 1 to 3 carbon atoms, and 2 stands for 2 or 3.

In the process of the invention, the reaction components are suitably reacted in a proportion of about 1 mole of amine to 1 mole of phosphite. In some cases, it may be of advantage to use one component, preferably the amine, with a slight excess. The reaction is preferably carried out at temperatures of about 60° to 150° C. Depending on the boiling or melting temperature of the amine used, the reaction may be carried out in the melt or using a suitable polar solvent, for example water or alcohols, or when using low boiling amines, for example methylamine, under superatmospheric pressure. The reaction products are obtained directly with high purity, so that in general a special purification of the products is not necessary. If the reaction has been carried out in the presence of solvents, it is merely necessary to remove them by distillation.

In general, the reaction according to the invention is preferably carried out in solvents, in particular in water. Depending on the temperature used, the reaction is in most cases completed within about 1 to 3 hours. In this case, the termination of the reaction can be determined when, in view of the solubility of the reaction products in water and other polar solvents, the previously insoluble starting products have disappeared.

The new hybrid-ionic phosphorus compounds are intermediate products with versatile utility in the manufacture of, for example, pesticides or textile auxiliary agents. Compounds in which at least one of the radicals $R^4$, $R^5$ or $R^6$ represents an alkyl or alkenyl group having at least 8 carbon atoms, have surface-active properties. They may find versatile use as tensides. For example, they are excellent emulsifiers in the preparation of oil-in-water emulsions.

Such compounds of the general formula I in which at least one of the radicals $R^4$, $R^5$ or $R^6$ represents an alkyl or alkenyl group containing at least 8 carbon atoms, in addition have a strong extraction power for zinc in the known processes of liquid-liquid extraction. In this respect, they are superior in their action to the known extraction agents, for example tri-n-butyl phosphate. For the liquid-liquid extraction, the aqueous zinc-containing phase is generally treated at an acid pH-value, for example at a pH-value of 4, with a water-insoluble organic phase, for example liquid hydrocarbons, which contains the above-mentioned compounds of the general formula I.

Examples of such compounds which contain aliphatic radicals with at least 8 carbon atoms are:

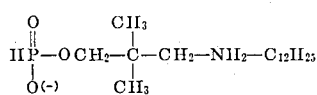

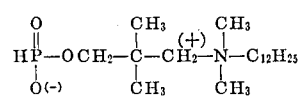

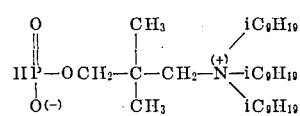

The following examples illustrate the invention. In these examples, the percentual data are percents by weight.

EXAMPLE 1

30 g of 2-oxo-(2H)-5,5-dimethyl-1,3-dioxa-2-phosphorinane and 40,5 g of triethylamine were heated with 100 ml of water for 2 hours under reflux to the boiling temperature. The solution was then evaporated to dryness. There were obtained 48 g of the compound of the formula

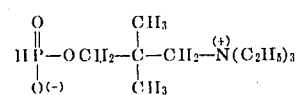

in the form a a colorless, water-soluble oil.

| Equivalent weight | calc. | 222 |
|---|---|---|
|  | found | 242 |
| Nitrogen | calc. | 5.6 % |
|  | found: | 4.2 %. |

EXAMPLE 2

30 g of 2-oxo-(2H)-5,5-dimethyl-1,3-dioxa-2-phosphorinane and 28.4 g of di-n-butylamine were reacted in 100 ml of ethanol in a manner analogous to that described in Example 1. There were thus obtained 55 g of the compound of the formula

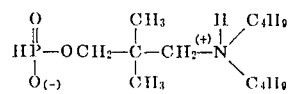

in the form of a colorless, water-soluble oil.

| Equivalent weight | calc. | 279 |
|---|---|---|
|  | found | 285 |
| Nitrogen | calc. | 5.0 % |
|  | found | 4.6 %. |

EXAMPLE 3

30 g of 2-oxo-(2H)-5,5-dimethyl-1,3-dioxa-2-phosphorinane and 29.8 g of triethanolamine were reacted in 100 ml of water in a manner analogous to that described in Example 1. There were thus obtained 59 g of the compound of the formula

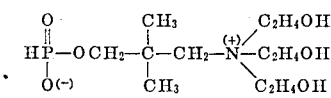

in the form of a colorless water-soluble oil.

| Equivalent weight | Calc. | 299 |
|---|---|---|
|  | Found | 335 |
| Nitrogen | Calc. | 4.7 % |
|  | Found | 4.4 %. |

EXAMPLE 4

30 g of 2-oxo-(2H)-5,5-dimethyl-1,3-dioxa-2-phosphorinane and 47,4 g of N,N-dimethyllaurylamine were reacted in 100 ml of water ain a manner analogous to that described in Example 1. There were obtained in the form of a colorless oil, 77 g of the compound of the formula

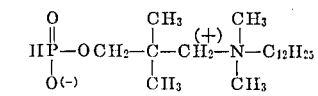

which was found to be well soluble in water and whose NMR spectrum corresponded with the formulated structure.

| Equivalent weight | Calc. | 387 |
|---|---|---|
|  | Found | 378 |
| Molecular weight | Calc. | 387 |
|  | Found | 372 (osmometrically) |
| Phosphorus | Calc. 8.0 % | Nitrogen: Calc. 3.6 % |
|  | Found 7.8 % | Found 3.6 %. |

EXAMPLE 5

30 g of 2-oxo-(2H)-5,5-dimethyl-1,3-dioxa-2-phosphorinane and 47.4 g of N,N-dimethyllaurylamine were heated to the melting temperature and the melt was stirred for 25 hours at 120°C. There were obtained 77 g of the compound of the formula $$\begin{array}{c} O \\ \| \\ HP-OCH_2-\underset{\underset{CH_3}{|}}{\overset{\overset{CH_3}{|}}{C}}-CH_2-\underset{\underset{CH_3}{|}}{\overset{\overset{CH_3}{|}}{N^{(+)}}}-C_{12}H_{25} \\ | \\ O^{(-)} \end{array}$$

in the form of a colorless water-soluble oil

| Equivalent weight | Calc. 387 |
| --- | --- |
|  | Found 450 |
| Nitrogen | Calc. 3.6 % |
|  | Found 3.5 % |

EXAMPLE 6

30 g of 2-oxo-(2H)-5,5-dimethyl-1,3-dioxa-2-phosphorinane and 57 g of N,N-dimethylstearylamine were reacted in 150 ml of water in the manner described in Example 1. There were obtained 86 g of the compound of the formula $$\begin{array}{c} O \\ \| \\ HP-OCH_2-\underset{\underset{CH_3}{|}}{\overset{\overset{CH_3}{|}}{C}}-CH_2-\underset{\underset{CH_3}{|}}{\overset{\overset{CH_3}{|}}{N^{(+)}}}-C_{18}H_{37} \\ | \\ O^{(-)} \end{array}$$

in the form of a colorless water-soluble oil.

| Equivalent weight | Calc. 435 |
| --- | --- |
|  | Found 471 |
| Nitrogen | Calc. 3.2 % |
|  | Found 3.0 %. |

EXAMPLE 7

30 g of 2-oxo-(2H)-5,5-dimethyl-1,3-dioxa-2-phosphorinane and 107.2 g of distearyl-N-methylamine were reacted in 500 ml of water in the manner described in Example 1. There were obtained 137 g of the reaction product corresponding to the formula $$\begin{array}{c} O \\ \| \\ HP-OCH_2-\underset{\underset{CH_3}{|}}{\overset{\overset{CH_3}{|}}{C}}-CH_2-\underset{\underset{C_{18}H_{37}}{\diagdown}}{\overset{\overset{H\ \ C_{18}H_{37}}{\diagup}}{N^{(+)}}} \\ | \\ O^{(-)} \end{array}$$

in the form of a colorless solid substance which was found to be dispersible in water.

| Equivalent weight | Calc. 686 |
| --- | --- |
|  | Found 650 |
| Nitrogen | Calc. 2.0 % |
|  | Found 2.1 %. |

EXAMPLE 8

30 g of 2-oxo-(2H)-5,5-dimethyl-1,3-dioxa-2-phosphorinane and 37 g of tri-n-butylamine were reacted in 100 ml of water in a manner analogous to that described in Example 1. There were obtained 66 g of the compound of the formula $$\begin{array}{c} O \\ \| \\ HP-OCH_2-\underset{\underset{CH_3}{|}}{\overset{\overset{CH_3}{|}}{C}}-CH_2-\underset{\underset{C_4H_9}{\diagdown}}{\overset{\overset{C_4H_9}{\diagup}}{N^{(+)}}}-C_4H_9 \\ | \\ O^{(-)} \end{array}$$

in the form of a colorless water-soluble oil.

| Equivalent weight | Calc. 335 |
| --- | --- |
|  | Found 344 |
| Nitrogen | Calc. 4.2 % |
|  | Found 3.8 %. |

EXAMPLE 9

20 g of 2-oxo-(2H)-5,5-dimethyl-1,3-dioxa-2-phosphorinane and 17 g of N,N-dimethylcyclohexylamine were reacted in 50 ml of water in the manner described in Example 1. There were obtained 36 g of the compound of the formula $$\begin{array}{c} O \\ \| \\ HP-OCH_2-\underset{\underset{CH_3}{|}}{\overset{\overset{CH_3}{|}}{C}}-CH_2-\underset{\underset{CH_3}{|}}{\overset{\overset{CH_3}{|}}{N^{(+)}}}-C_6H_{11} \\ | \\ O^{(-)} \end{array}$$

in the form of a colorless water-soluble oil.

| Equivalent weight | Calc. 277 |
| --- | --- |
|  | Found 272 |
| Nitrogen | Calc. 5.0 % |
|  | Found 4.6 %. |

EXAMPLE 10

24.4 g of 2-oxo-(2H)-1,3-dioxa-2-phosphorinane and 45 g of N,N-dimethyllaurylamine were reacted in 100 ml of water in the manner described in Example 1. There were obtained 68 g of the compound of the formula $$\begin{array}{c} O \\ \| \\ HP-OCH_2-CH_2-CH_2-\underset{\underset{CH_3}{|}}{\overset{\overset{CH_3}{|}}{N^{(+)}}}-C_{12}H_{25} \\ | \\ O^{(-)} \end{array}$$

in the form of a colorless water-soluble oil.

| Equivalent weight | Calc. 359 |
| --- | --- |
|  | Found 345 |
| Nitrogen | Calc. 3.9 % |
|  | Found 3.9 %. |

EXAMPLE 11

27.6 g of 2-oxo-(2H)-4-methyl-1,3-dioxa-2- phosphorinane and 38.6 g of laurylamine were reacted in 100 ml of water in the manner described in Example 1. There were obtained 66 g of the compound of the formula

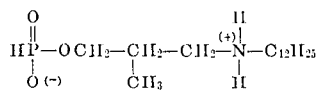

in the form of a colorless, water-soluble oil.

| Equivalent weight | Calc. 329 |
| --- | --- |
|  | Found 305 |
| Nitrogen | Calc. 4.3 % |
|  | Found 4.1 %. |

EXAMPLE 12

30 g of 2-oxo-(2H)-5-ethyl-1,3-dioxa-2-phosphorinane and 57 g of N,N-dimethylstearylamine were reacted in 150 ml of water in the manner described in Example 1. there were obtained 85 g of the compound of the formula

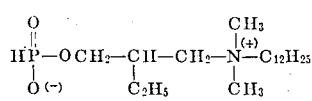

in the form of a colorless water-soluble oil.

| Equivalent weight | Calc. 435 |
| --- | --- |
|  | Found 412 |
| Nitrogen | Calc. 3.2 % |
|  | Found 3.1 %. |

EXAMPLE 13

30 g of 2-oxo-(2H)-5,5-dimethyl-1,3-dioxa-2-phosphorinane and 54 g of 1-lauramido-propyl-dimethylamine-(3) were reacted in 200 ml of water in the manner described in Example 1. There were obtained 88 g of the compound of the formula

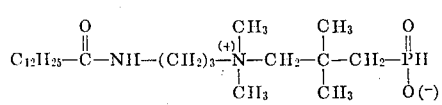

in the form of a colorless water-soluble oil.

| Equivalent weight | Calc. 438 |
| --- | --- |
|  | Found 448 |
| Nitrogen | Calc. 6.4 % |
|  | Found 5.9 %. |

EXAMPLE 14

34 g of 2-oxo-(2H)-5,5-dimethyl-1,3-dioxa-2-phosphorinane and 79 g of N,N-dimethyl-oleylamine were reacted in 200 ml of water in the manner described in Example 1. There were obtained 112 g of the compound of the formula

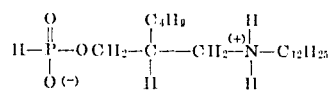

in the form of a water-soluble oil.

| Equivalent weight | Calc. 321 |
| --- | --- |
|  | Found 341 |
| Nitrogen | Calc. 4.4 % |
|  | Found 4.2 %. |

EXAMPLE 15

30 g of 2-oxo-(2H)-5,5-dimethyl-1,3-dioxa-2-phosphorinane and 32.4 g of isononylamine were reacted in 100 ml of water in the manner described in Example 1. There were obtained 61.5 g of the compound of the formula

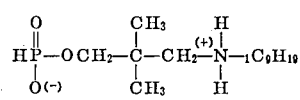

in the form of a water-soluble oil.

| Equivalent weight | Calc. 312 |
| --- | --- |
|  | Found 316 |
| Nitrogen | Calc. 4.5 % |
|  | Found 4.3 % |

EXAMPLE 16

35.6 g of 2-oxo-(2H)-5-n-butyl-1,3-dioxa-2-phosphorinane and 38.6 g of laurylamine were reacted in 150 ml of water in the manner described in Example 1. There were obtained 73 g of the compound of the formula

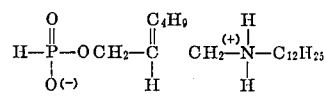

in the form of a water-soluble oil.

| Equivalent weight | Calc. 321 |
| --- | --- |
|  | Found 341 |
| Nitrogen | Calc. 4.4 % |
|  | Found 4.2 %. |

EXAMPLE 17

30 g of 2-oxo-(2H)-5,5-dimethyl-1,3-dioxa-2- phosphorinane and 18 g of morpholine were reacted in 100 ml of water in the manner described in Example 1. There were obtained 46.5 g of the compound of the formula

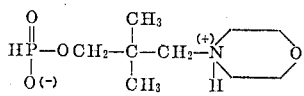

in the form of a water-soluble oil.

| Equivalent weight | Calc. 237 |
| --- | --- |
|  | Found 253 |
| Nitrogen | Calc. 5.9 % |
|  | Found 5.3 %. |

EXAMPLE 18

30 g of 2-oxo-(2H)-5,5-dimethyl-1,3-dioxa-2-phosphorinane and 25.5 g of piperidine were reacted in 100 ml of water in the manner described in Example 1. There were obtained 46.5 of the compound of the formula

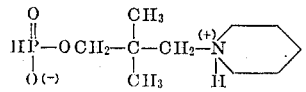

in the form of a water-soluble oil.

| Equivalent weight: | Calc. 235 |
| --- | --- |
|  | Found 267 |
| Nitrogen | Calc. 5.9 % |
|  | Found 5.3 %. |

EXAMPLE 19

15 g of 2-oxo- (2H)-5,5-dimethyl-1,3-dioxa-2-phosphorinane and 63.3 g of an addition compound of 8 moles of ethylene oxide and 1 mole of oleylamine were reacted in 150 ml of water in the manner described in Example 1. There were obtained 78 g of the compound of the general formula

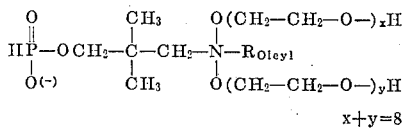

x+y=8 in the form of a water-soluble oil.

| Equivalent weight | Calc. 783 |
| --- | --- |
|  | Found 766 |
| Nitrogen | Calc. 1.8 % |
|  | Found 1.8 %. |

EXAMPLE 20

15 g of 2-oxo-(2H)-5,5-dimethyl-1,3-dioxa-2-phosphorinane and 11 g of benzylamine were reacted in 100 ml of water in the manner described in Example 1. There were obtained 25 g of the compound of the formula

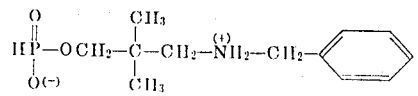

in the form of a colorless water-soluble oil.

| Equivalent weight | Calc. 257 |
| --- | --- |
|  | Found 275 |
| Nitrogen | Calc. 5.4 % |
|  | Found 5.0 % |

EXAMPLE 21

15 g of 2-oxo-(2H)-5,5-dimethyl-1,3-dioxa-2-phosphorinane and 42 g of tri-isononylamine were reacted in 100 ml of water in the manner described in Example 1. There were obtained 56 g of the compound of the formula

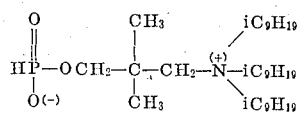

in the form of a water-insoluble oil.

| Equivalent weight | Calc. 570 |
| --- | --- |
|  | Found 524 |
| Nitrogen | Calc. 2.5 % |
|  | Found 2.5 %. |

We claim:

1. Compounds of the general formula

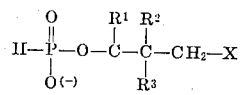

in which $R^1$ represents hydrogen or the methyl group, $R^2$ and $R^3$ which may be identical or different, each represent hydrogen or alkyl groups of 1 to 4 carbon atoms, and X represents an ammonium group of the general formula $$-N^+R^4R^5R^6$$

in which $R^4$ represents hydrogen, an alkyl or alkenyl group of 1 to 12 carbon atoms or a group of the formula $-(C_nH_{2n}O)_zH$; $R^5$ represents hydrogen or an alkyl or alkenyl radical of 1 to 20 carbon atoms or a group of the formula $-(C_nH_{2n}O)_zH$ and $R^6$ represents an alkyl or alkenyl radical of 1 to 20 carbon atoms or a group of the formula $-(C_nH_{2n}O)_zH$ in which n stands for 2 or 3, and the sum of all values of z represents 1 to 50, and wherein at least one of the radicals $R^4$, $R^5$ and $R^6$ represents an alkyl or alkenyl radical containing at least 8 carbon atoms.

2. A compound of the formula

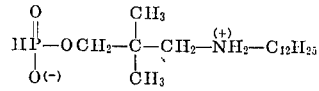

3. A compound of the formula
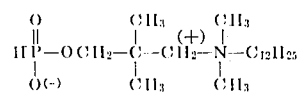
4. A compound of the formula
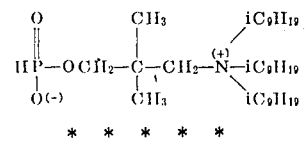
* * * * *